Patented Aug. 1, 1939

2,167,639

UNITED STATES PATENT OFFICE 2,167,639

CHLORALKYL XENOXY ETHERS

Gerald H. Coleman, Lindley E. Mills, and Garnett V. Moore, Midland, Mich., assignors to The Dow Chemical Company, Midland, Mich., a corporation of Michigan No Drawing. Application July 13, 1936, Serial No. 90,380

6 Claims. (Cl. 260—612)

This invention concerns certain new glycol ethers and a method of making the same.

The new ethers herein disclosed have the general formula

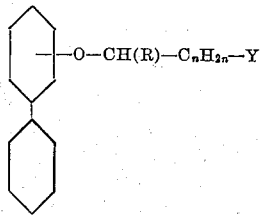

wherein the xenyl, i. e., diphenyl, radical may contain neutral substituents, such as halogen or alkyl groups, R represents hydrogen or an alkyl group, and Y represents a halogen or a xenoxy radical attached to a primary or secondary carbon atom, which xenoxy radical may also contain neutral substituents. Such ethers are hereinafter referred to generically as "xenyl-glycol ethers". They are useful as plasticizing agents in lacquers and varnishes and in nitrocellulose, cellulose acetate, and cellulose ether compositions. They may also be employed as chemical agents for the preparation of a variety of organic compounds.

The xenyl-glycol ethers are prepared by heating a dihalo aliphatic hydrocarbon to a reaction temperature with a metal xenate (or a mixture of a xenol and a metal hydroxide) in the presence or absence of a reaction medium, such as water, alcohol, benzene, etc. The dihalo aliphatic hydrocarbon reactant is a saturated compound containing chlorine and/or bromine as the halogen substituents, the latter being attached to two different primary or secondary carbon atoms. Among the various dihalo aliphatic hydrocarbons which may be employed are ethylene chloride, ethylene bromide, 1-chloro-2-bromo-ethane, propylene chloride, 1.3-dichloro-propane, 1-chloro-3-bromo-propane, 1.3-dichloro-isobutane, 1.3-dibromo-butane, 1.4-dichloro-butane, a normal-butylene chloride, a normal-hexylene chloride, etc. The metal hydroxide or xenate is preferably an alkali metal compound, e. g., a sodium or potassium compound, although corresponding compounds of other metals, e. g., calcium or barium, can be used.

The reactants may be employed in any desired proportions, but for sake of economy and to avoid side reactions which may occur, especially when water or alcohol is used as a reaction medium, the hydroxide is preferably employed in a proportion not greatly exceeding that required to form a salt of the xenol. When a mono-xenyl ether of a halo aliphatic hydrocarbon is the product desired, one molecular equivalent or more of the dihalo aliphatic hydrocarbon reactant is preferably employed per mole of xenol. When a di-xenyl ether of a glycol is desired, approximately two moles of a xenol, or an equivalent amount of a metal xenate, is preferably used per mole of the dihalo aliphatic hydrocarbon reactant.

The reaction usually occurs smoothly at temperatures between 80° and 125° C., but may be carried out at considerably higher temperatures, e. g., 200° C., if desired. It may be effected by heating the reaction mixture under reflux at atmospheric pressure or by heating it under pressure in a bomb or autoclave. The time of heating required to complete the reaction varies from a few minutes to several hours, depending upon the particular reactants employed, the temperature at which the reaction is carried out, etc.

The ether product is separated by conventional procedure, e. g., by distillaion of the reacted mixture.

The following examples describe a number of ways in which the principle of the invention has been applied, but are not to be construed as limiting the invention.

Example 1

A mixture of 170 grams (1 mole) of ortho-xenol, 198 grams (2 moles) of ethylene chloride, 50 grams (1.25 moles) of sodium hydroxide, and 250 grams of water was heated to 83° C. under reflux for 24 hours. The mixture was then cooled and neutralized with sulphuric acid after which the organic layer thereof was separated and fractionally distilled. There were obtained 81.6 grams (0.48 mole) of unreacted ortho-xenol, and 117.5 grams (0.50 mole) of 1-chloro-2-(ortho-xenoxy-) ethane, the yield of the latter being 97 per cent of theoretical based on the ortho-xenol reacted. The 1-chloro-2-(ortho-xenoxy-) ethane is a white crystalline compound melting at approximately 55.2° C. and boiling at approximately 174°–176° C. under 10 millimeters pressure. It has the formula

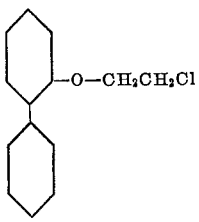

Example 2

A mixture of 340 grams (2 moles) of ortho-xenol, 198 grams (2 moles) of ethylene chloride, 111 grams (1 mole) of calcium hydroxide was heated to 150° C. in a rotating bomb for 6 hours. The bomb was then cooled and the charge was removed. The organic layer of the mixture was separated and distilled, whereby 243 grams (1.43 moles) of unreacted ortho-xenol was recovered and 35.6 grams (0.153 mole) of 1-chloro-2-(ortho-xenoxy-) ethane were separated. No di-(ortho-xenoxy) ethane was obtained.

Example 3

A mixture of 510 grams (3 moles) of ortho-xenol, 148.5 grams (1.5 moles) of ethylene chloride, 120 grams (3 moles) of sodium hydroxide, and 450 cubic centimeters of benzene was heated to 150° C. in a rotating bomb for 4 hours. The bomb was then cooled and the charge removed. The mixture was acidified by treatment with a dilute sulphuric acid solution, washed thoroughly with water and distilled. There were obtained 253 grams (1.49 moles) of unreacted ortho-xenol, 56.6 grams (0.243 mole) of 1-chloro-2-(ortho-xenoxy)ethane and 197.5 grams (0.54 mole) of 1.2-di-(ortho-xenoxy-) ethane. The yields of 1-chloro-2-(ortho-xenoxy-) ethane and 1.2-di-(ortho-xenoxy-) ethane were 16.2 per cent and 76 per cent of theoretical, respectively, based on the ortho-xenol reacted.

Example 4

A mixture of 510 grams (3 moles) of ortho-xenol, 594 grams (6 moles) of ethylene chloride, and 240 grams (6 moles) of sodium hydroxide was heated for about 15 minutes in a rotating bomb at temperatures which rose spontaneously from about 150° C. to 205° C. during said period. The bomb was then cooled, the charge removed, and the products separated as in Example 3. There were obtained, 128 grams (0.75 mole) of unreacted ortho-xenol, 312 grams (1.34 moles) of 1-chloro-2-(ortho-xenoxy-) ethane, and 126 grams (0.34 mole) of 1.2-di-(ortho-xenoxy) ethane. The yields of 1-chloro-2-(ortho-xenoxy-) ethane and 1.2-di-(ortho-xenoxy-) ethane were 59.5 per cent and 30.5 per cent of theoretical, respectively, based on the ortho-xenol reacted.

Example 5

A mixture of 510 grams (3 moles) of ortho-xenol, 564 grams (3 moles of ethylene bromide, 123.2 grams (3.08 moles) of sodium hydroxide, and 751 grams of water was heated under reflux at temperatures varying from 86° to 100° C. for 1.5 hours. The mixture was then cooled, neutralized with sulphuric acid, and the organic layer thereof was separated and distilled. There were obtained 302 grams (1.74 moles) of unreacted ortho-xenol, 296 grams (1.07 moles of 1-bromo-2-(ortho-xenoxy-) ethane, and 25.6 grams (0.07 mole) of 1.2-di-(ortho-xenoxy-) ethane. The yields of 1-bromo-2-(ortho-xenoxy-) ethane and 1.2-di-(ortho-xenoxy-) ethane, based on the ortho-xenol reacted, were 84.7 per cent and 10.6 per cent of theoretical, respectively. The 1-bromo-2-(ortho-xenoxy-) ethane is a white crystalline compound melting at 66.5° C., boiling at approximately 170°–175° C. under 5 millimeters pressure, and having the formula

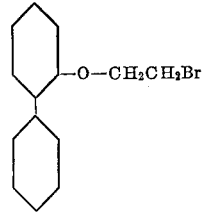

The 1.2-di-(ortho-xenoxy-) ethane product is a white crystalline compound melting at 100.5° C., boiling at about 268° C. under 5 millimeters pressure, and having the formula

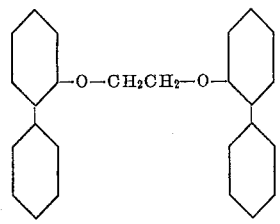

Example 6

A mixture of 510 grams (3 moles) of meta-xenol, 594 grams (6 moles) of ethylene chloride, 123.2 grams (3.08 moles) of sodium hydroxide, and 180 grams of water was heated under pressure in a rotating bomb at 100° C. for 10 hours. The bomb was then cooled and the charge removed and neutralized with sulphuric acid after which the organic layer of the mixture was separated and distilled. By the distillation there were separated 153 grams (0.90 mole) of unreacted meta-xenol and 288 grams (1.67 moles) of 1-chloro-2-(meta-xenoxy-) ethane, the yield of the latter being 79.3 per cent of theoretical based on the meta-xenol reacted. The 1-chloro-2-(meta-xenoxy-) ethane is a viscous liquid boiling at approximately 179°–181° C. under 5 millimeters pressure and having the formula

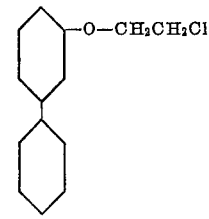

High boiling material, remaining after the above distillation, was fractionally crystallized from carbon tetrachloride, whereby 62.2 grams (0.17 mole) of 1.2-di-(meta-xenoxy-) ethane, was separated as white crystals melting at 128°–129° C., the yield thereof being 15.9 per cent of theoretical based on the meta-xenol reacted. Said product has the formula

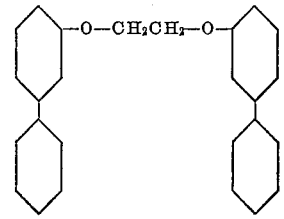

Example 7

A mixture of 170 grams (1 mole) of para-xenol, 99 grams (1 mole) of ethylene chloride, 41.2 grams (1.03 mole) of sodium hydroxide, and 252 grams of water was heated under reflux at temperatures varying from 73° to 91° C. for 24 hours. The reaction products were then separated as in Example 3. There were obtained:— 78 grams (0.335 mole) of 1-chloro-2-(para-xenoxy-) ethane as a white crystalline compound melting at 103° C. and boiling at approximately 163°–165° C. under 3 millimeters pressure; and 7.3 grams (0.02 mole) of 1.2-di-(para-xenoxy-) ethane as a white crystalline compound melting at 219° C. The 1-chloro-2-(para-xenoxy-) ethane and 1.2-di-(para-xenoxy-) ethane have the following respective formulas:—

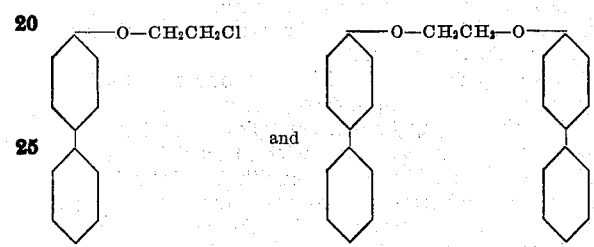

Example 8

A mixture of 510 grams (3 moles) of ortho-xenol, 678 grams (6 moles) of propylene chloride, 123.2 grams (3.08 moles) of sodium hydroxide and 756 grams of water was heated at temperatures varying between 74° and 80° C. under reflux for 24 hours. The products were then separated as in Example 1. There were obtained 454 grams (2.67 moles) of unreacted ortho-xenol and 61.6 grams (0.25 mole) of a monochloro-mono-(ortho-xenoxy-) propane as a viscous liquid boiling at approximately 147°–149° C. under 3 millimeters pressure and having probably the formula

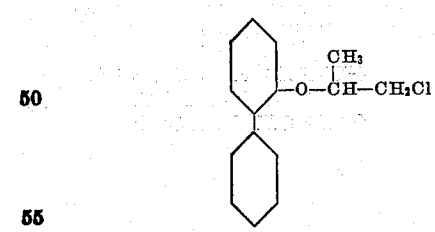

The yield of said ether product was 77 per cent of theoretical based on the ortho-xenol reacted.

Example 9

A mixture of 510 grams (3 moles) of ortho-xenol, 381 grams (3 moles) of 1.3-dichloro-iso-butane, 123.2 grams (3.08 moles) of sodium hydroxide and 750 grams of water was heated at temperatures between 93° and 101° C. under reflux for 10 hours, after which the products were separated as in Example 1. There were obtained 246 grams (1.45 moles) of unreacted ortho-xenol, 252 grams (0.95 mole) of 1-chloro-3-(ortho-xenoxy-) isobutane and 102.5 grams (0.26 mole) of 1.3-di-(ortho-xenoxy-) isobutane. The 1-chloro-3-(ortho-xenoxy-) isobutane is a viscous liquid boiling at approximately 170°–173° C. under 5 millimeters pressure and having the formula

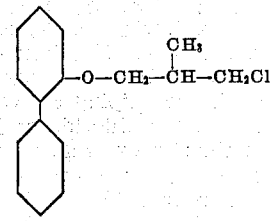

The 1.3-di-(ortho-xenoxy-) isobutane is a more viscous liquid boiling at approximately 280°–285° C. under 5 millimeters pressure and having the formula

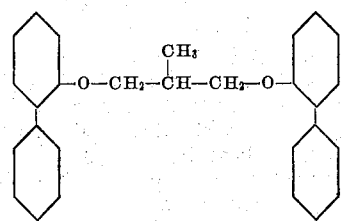

Example 10

A mixture of 105.6 grams (0.46 mole) of 2-hydroxy-5-chloro-xenene, 92.1 grams (0.93 mole) of ethylene chloride, 19.2 grams (0.48 mole) of sodium hydroxide and 117 grams of water was heated under reflux at temperatures varying from 73° to 83° C. for 24 hours, after which the products were separated as in Example 1. There were obtained 48.8 grams (0.24 mole) of unreacted 2-hydroxy-5-chloro-xenene, and 53.4 grams (0.20 mole) of 1-chloro-2-(5-chloro-ortho-xenoxy-) ethane, the yield of the latter being approximately 92 per cent of theoretical based on the 2-hydroxy-5-chloro-xenene reacted. The 1-chloro-2-(5-chloro-ortho-xenoxy-) ethane is a viscous liquid boiling at approximately 149°–150° C. under 3 millimeters pressure and having the formula

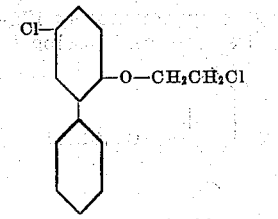

Example 11

A mixture of 182.2 grams (0.86 mole) of 2-hydroxy-5-isopropyl-xenene, 170.3 grams (1.72 moles) of ethylene chloride, 35.2 grams (0.88 mole) of sodium hydroxide and 216 grams of water was heated under reflux at temperatures between 77° and 85° C. for 24 hours. The products were then separated as in Example 1. There were obtained 142 grams (0.67 mole) of unreacted 2-hydroxy-5-isopropyl-xenene and 46.7 grams (0.17 mole) of 1-chloro-2-(5-isopropyl-ortho-xenoxy-) ethane, the latter being a viscous liquid boiling at approximately 150°–153° C. under 2 millimeters pressure and having the specific gravity 1.093 at 20° C. Said product has the formula

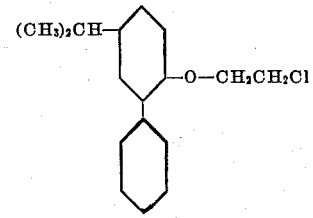

Still other xenyl-glycol ethers may be prepared according to the procedure hereinbefore described by using other substituted xenols, e. g., 2-hydroxy - 5 - methyl-xenene, 2-hydroxy-4-ethyl-6-chloro-xenene, 2.2'-dichloro-4-hydroxy-xenene, etc., and other dihalo aliphatic hydrocarbons, e. g., a normal butylene chloride or bromide, a normal amylene chloride or bromide, etc., as reactants. Insofar as we are aware, any xenol containing no strongly acidic or basic radical may be reacted with any saturated dihalo aliphatic hydrocarbon containing chlorine and/or bromine as the halogen substituents and having the halogen atoms situated on two different primary or secondary carbon atoms to form the corresponding xenyl-glycol ether.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. A compound having the general formula

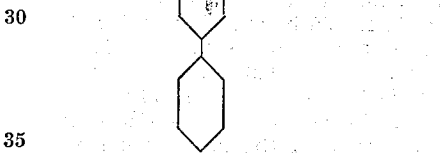

wherein R is a substituent of the class consisting of hydrogen and alkyl radicals, $n$ is an integer, and the chlorine is attached to a carbon atom other than a tertiary carbon atom.

2. 1-chloro-2-(ortho-xenoxy-) ethane, a white crystalline compound melting at approximately 55.2° C., boiling at approximately 174–176° C. at 10 millimeters pressure, and having the formula

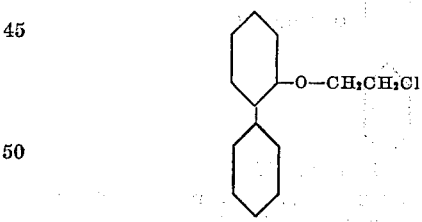

3. Monochloro - mono-(ortho - xenoxy - ) propane, a viscous liquid boiling at approximately 147–149° C. at 3 millimeters pressure and having probably the formula

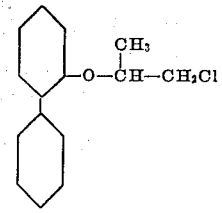

4. In a method of making a xenyl-glycol ether, the step which consists in heating a metal xenate to a reaction temperature with a saturated dihalo aliphatic hydrocarbon containing the halogen atoms attached to two different primary or secondary carbon atoms.

5. In a method of making a mono-xenyl ether of a mono-halo aliphatic hydrocarbon, the step which consists in heating an alkali metal xenate to a reaction temperature with at least its molecular equivalent of a saturated dihalo aliphatic hydrocarbon, wherein the halogen substituents are of the class consisting of chlorine and bromine and said halogen substituents are attached to two different primary or secondary carbon atoms.

6. A compound having the general formula

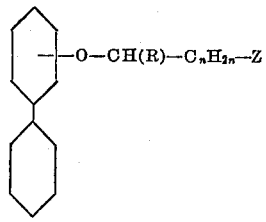

wherein R is a substituent of the class consisting of hydrogen and alkyl radicals, $n$ is an integer, Z is a halogen selected from the class consisting of chlorine and bromine, and said halogen is attached to a primary or secondary carbon atom.

GERALD H. COLEMAN.
LINDLEY E. MILLS.
GARNETT V. MOORE.